Figure 1:
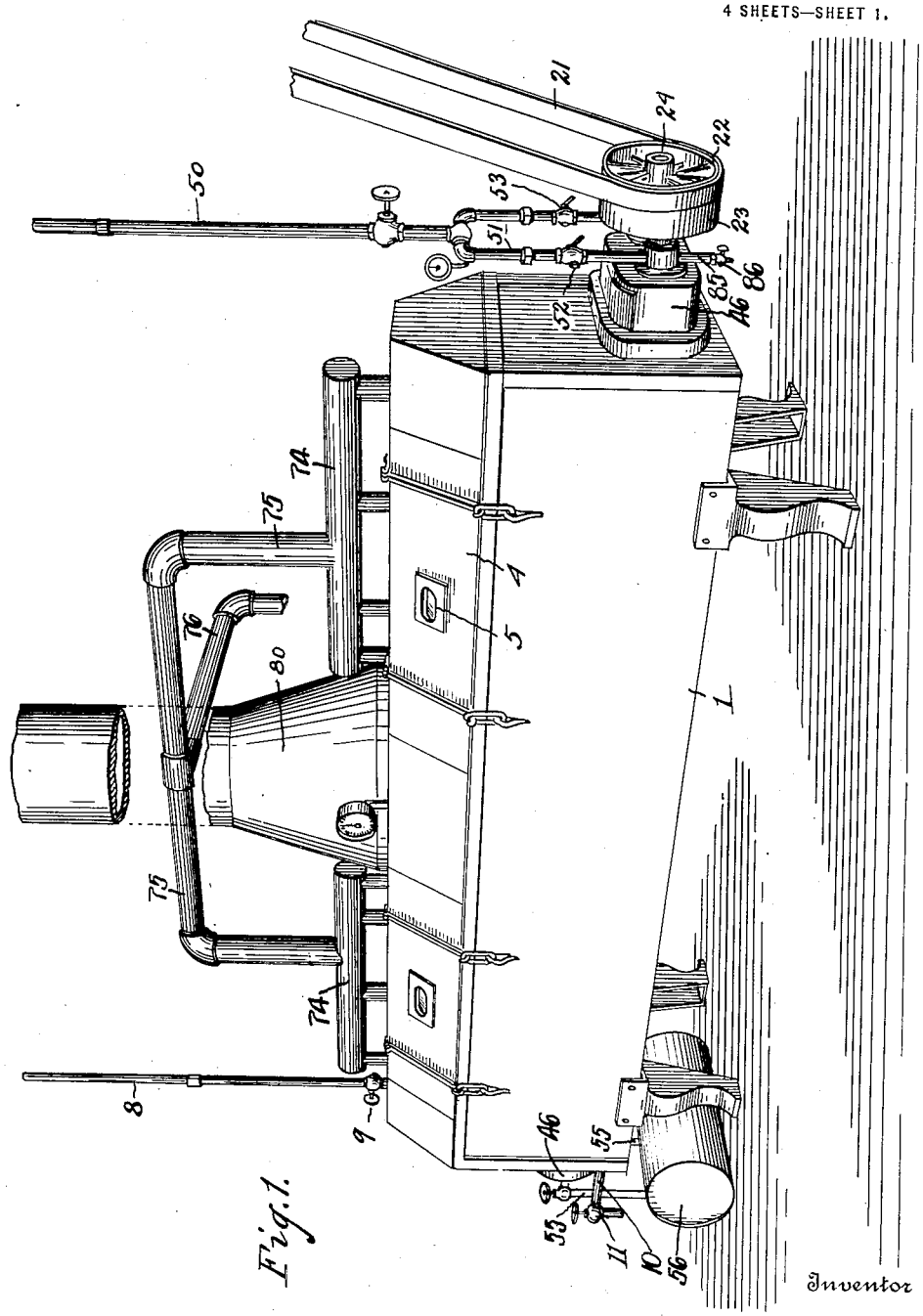

J. F. RUFF.
EVAPORATOR AND PASTEURIZER.
APPLICATION FILED JAN. 16, 1919. RENEWED JULY 26, 1920.

1,354,342.

Patented Sept. 28, 1920.
4 SHEETS—SHEET 1.

Inventor
John F. Ruff.
By Pagelsen D. Spencer
Attorneys

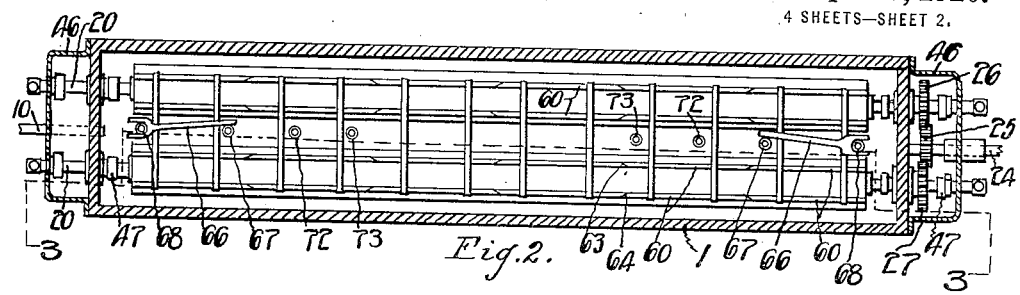
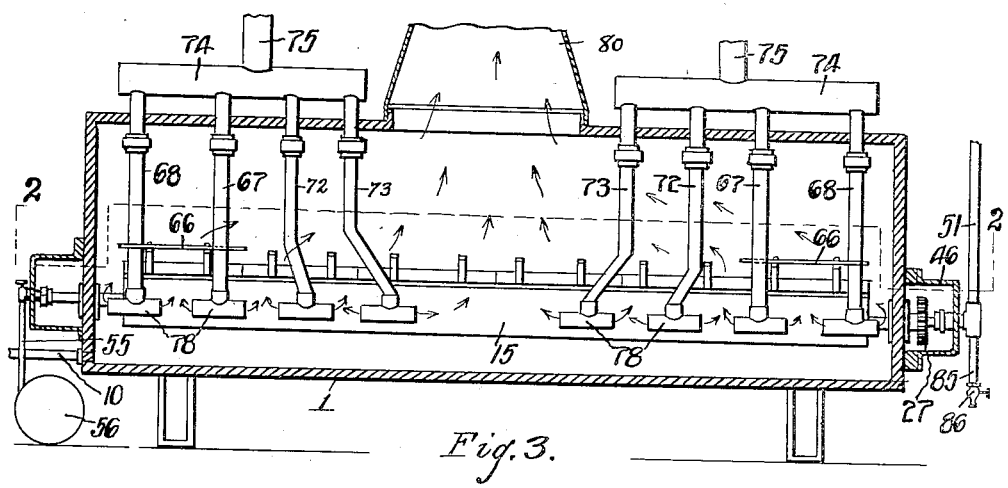
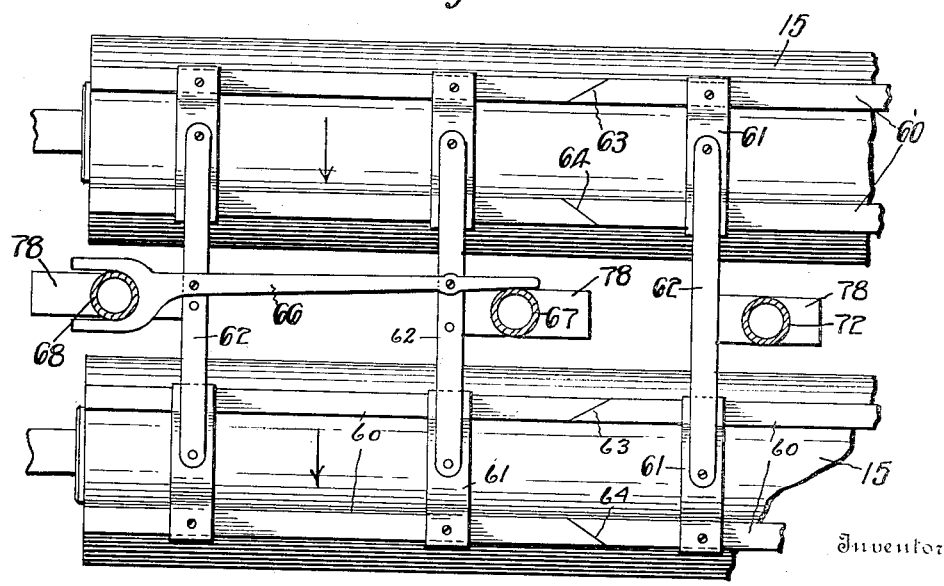

J. F. RUFF.
EVAPORATOR AND PASTEURIZER.
APPLICATION FILED JAN. 16, 1919. RENEWED JULY 26, 1920.
1,354,342.
Patented Sept. 28, 1920.
4 SHEETS—SHEET 3.
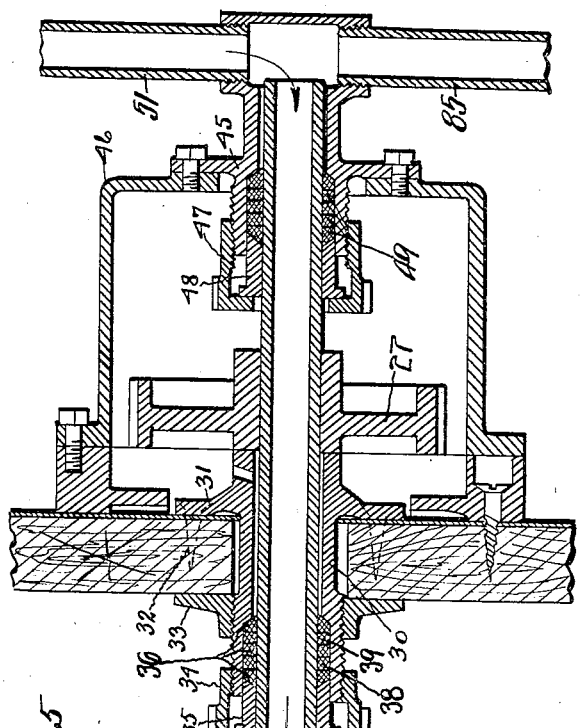
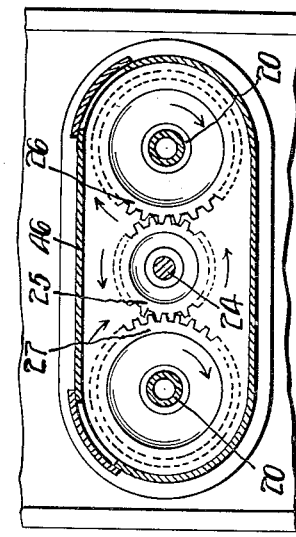
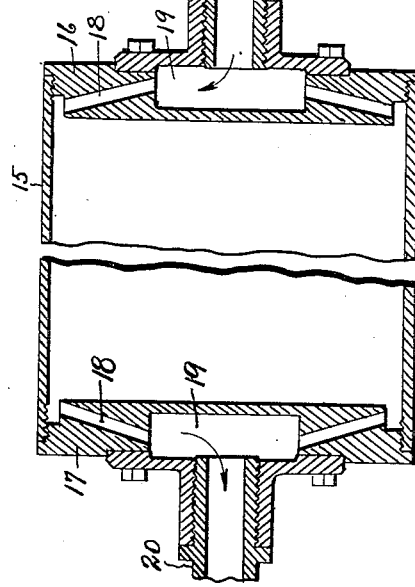
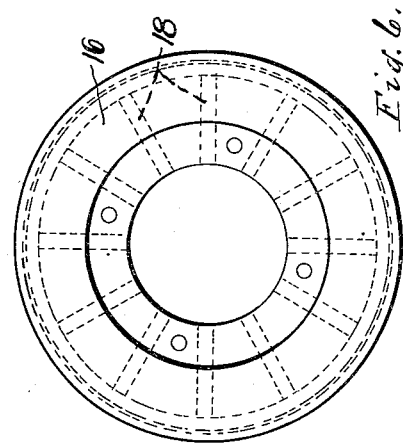
Inventor
John F. Ruff,
By Pagelsen D. Spencer
Attorneys

UNITED STATES PATENT OFFICE.

JOHN F. RUFF, OF PORT HURON, MICHIGAN.

EVAPORATOR AND PASTEURIZER.

1,354,342.    Specification of Letters Patent.    Patented Sept. 28, 1920.

Continuation of application filed December 26, 1917, Serial No. 208,853. This application filed January 16, 1919, Serial No. 271,382. Renewed July 26, 1920. Serial No. 399,159.

*To all whom it may concern:*

Be it known that I, JOHN F. RUFF, a citizen of the United States, and residing at Port Huron, in the county of St. Clair and State of Michigan, have invented a new and Improved Evaporator and Pasteurizer, of which the following is a specification.

The usual practice in evaporating milk is to boil the liquid in a vacuum tank, but this process is objectionable because of the high cost of the apparatus required. It is also inefficient because of the large proportion of heat which is wasted in the condensing water whereby the vacuum is maintained. The evaporation might be effected in open tanks of ordinary construction but the action would be so slow as to be commercially prohibitive; again, the product would be nonsalable since, as is well known, the flavor of milk which has been boiled under atmospheric pressure is apt to be objectionable.

The object of the present invention is to provide a device wherein an artificial boiling at a high rate is secured under substantially atmospheric pressure and at a temperature well below 212° F. (although preferably high enough to insure thorough pasteurization), whereby a rapid evaporation is caused to take place under conditions that leave the milk palatable, and whereby a high heat efficiency is obtained.

To the end of providing practical and efficient means for carrying out the purposes stated, the invention consists in an open tank—that is, one in the interior of which the pressure is substantially atmospheric—having therein a rotatable self-cleaning steam drum constructed to constantly clear itself of condensed water, whereby a highly heated non-blistered surface is presented to the milk or milk product at all times, together with air blast means for rapidly blowing out the vapor. The temperature of the drum or, in other words, the temperature at which the heat is communicated to the milk is thus well toward that corresponding to the live steam in the cylinder—which results in the high heat efficiency referred to—but its rate and manner of transmission into the milk is such that, although the latter may be rapidly evaporated and pasteurized, it at no time becomes scorched or takes on an objectionable burned taste. In this way a compact thoroughly commercial evaporator and pasteurizer, tested by quantity and quality of output and by cost of installation and maintenance, is produced.

The invention also consists in certain features of the drum structure whereby the steam is utilized to automatically expel the water constantly, thus in effect insuring the application of live steam directly to the metal of the drum; as compared with such efforts as have heretofore been made to heat the drum with hot water, this results in a very great advance in economy and capacity since the steam at say 45 to 50 pounds indicated pressure per square inch has a temperature of from 290° to 300° F. and a very much greater total heat than water at a temperature of approximately 212° F. That is, the amount of heat for each pound of steam handled is much greater than that per pound of water, and is, moreover, by virtue of its higher temperature, more rapidly available.

The advantages of the invention also extend to the boiler plant which may be smaller than in the case of hot water.

The invention further consists in a rotatable steam drum the outer surface of which is submerged in milk or the like to a substantially uniform depth throughout, together with scraping means bearing on said outer surface to keep it clean and polished. By this arrangement the heat is delivered directly into the body of the milk and local over-heating, such as might occur if parts of the drum structure were relatively deep down in the milk and other parts near the surface thereof, are avoided.

The invention is also concerned with certain improvements in the scraping or cleaning mechanism whereby it is rendered easily removable and whereby it operates to clean the drum uniformly from end to end.

The invention also consists in certain improvements in the air blast means by which large volumes of air are blown into and through the hot milk to drive off the vapor and to keep the temperature below that at which the milk might become scorched.

By the union of the several features enumerated, the heat is carried to the drum at high temperature—say 300° F.—with resultant economy, both initial and operating, in the heat producing plant; in passing from the drum to the film of milk which happens to contact with it at a given instant, a fall of temperature to say 165° F. normally takes place, which results in a very high rate of transmission of heat; and the air blast and cleaning means, when associated with a drum of the type stated, prevent all local blistering or other overheating of the milk. The actual temperature of treatment of the milk will vary somewhat under different conditions, and may be readily controlled by varying the rate of air supply or by throttling the steam or by super-heating device with which the machine may be provided.

The invention further consists in certain details of construction shown, described and claimed.

This application is a continuation of my application Serial No. 208,853, filed December 26, 1917.

Figure 8:
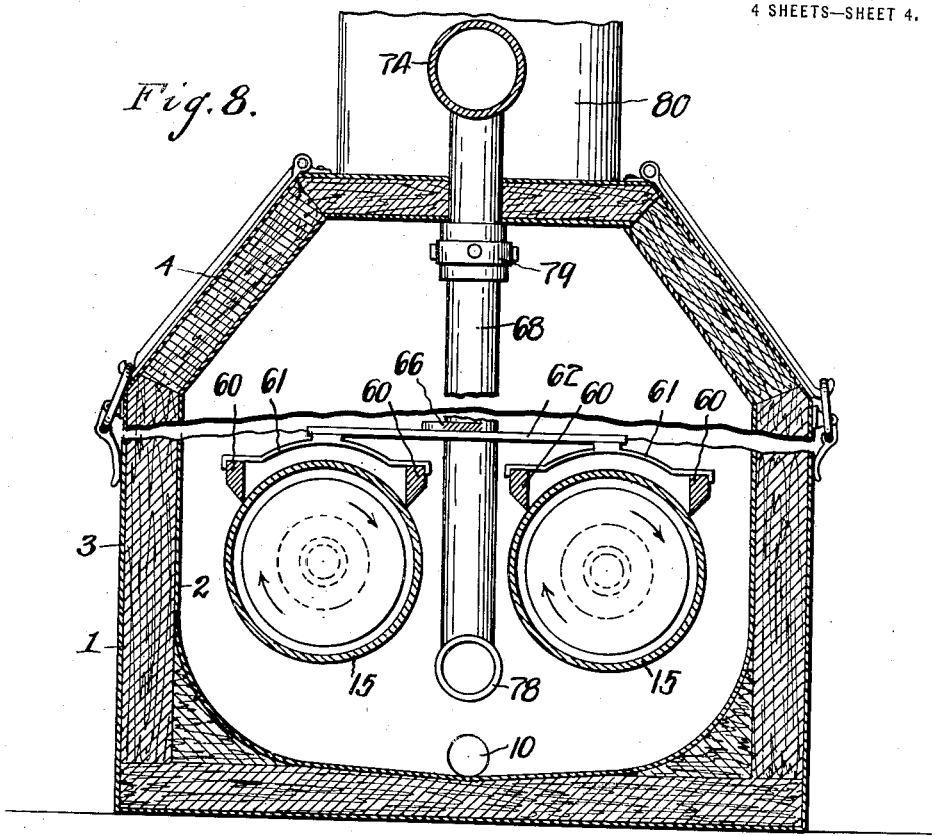
Figure 9:
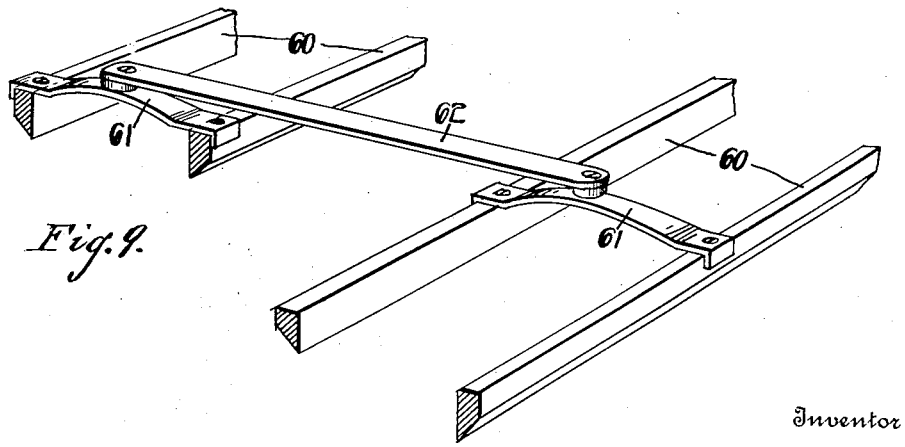

In the drawings, Figure 1 is a perspective view showing a preferred embodiment of the invention. Fig. 2 is a horizontal section above the drums. Fig. 3 is a section on line 3—3 of Fig. 2. Fig. 4 is an enlarged fragmentary section corresponding to Fig. 2. Fig. 5 is an enlarged central longitudinal section through one of the drums and associated parts. Fig. 6 is an end view of the drum head. Fig. 7 is a vertical section through the gear chamber. Fig. 8 is an enlarged transverse vertical section showing the relation of the drums and cleaners more clearly. Fig. 9 is a fragmentary perspective view of one of the cleaner bars and the associated parts.

The vat or tank may be constructed in various ways; as shown, it comprises a closed wooden body 1 lined on the inside with a copper sheet 2, Fig. 8, and covered with sheet iron 3. Doors 4 in the somewhat V-shaped top afford ready access to the interior for cleaning purposes, said doors, if desired, having sight glasses 5 through which the operation may be observed. The vat is supplied with milk or other product to be treated by a suitable means such as the pipe 8 and valve 9, and the condensed, or pasteurized product is drawn off through a pipe 10 and valve 11. If the device is to be operated on the "batch" principle both these pipes may be positioned at the same end of the tank, but if the operation is to be continuous it is more desirable to arrange them at opposite ends.

In the embodiment of the invention shown, the vat is provided with two cylindrical rotatable steam drums arranged parallel to one another, although but one may be used in some cases. Each drum, Fig. 5, comprises a cylindrical body 15 into the ends of which are threaded heads 16—17 that (at least at the discharge end) preferably include passages 18 connecting the corresponding central chamber 19 with the space just within the inner surface of the body or tube 15. The actual construction might be varied considerably at the inlet end, but it is desirable to thus direct the live steam at once into contact with the inner surface of the drum; at the outlet end the construction shown has a different, and important, function as will be explained later. The drums are supported on hollow gudgeons or shafts 20 that pass out through corresponding combined glands and bearings carried by the end walls of the vat. The belt 21, tight and loose pulleys 22—23 (Fig. 1), shaft 24, and gears 25—26—27 afford a convenient means for driving the drums, as will be readily understood.

Obviously considerable latitude is possible in the construction of the combined glands and bearings, but that shown is inexpensive and well suited to the purpose. It consists in a main hub 30, Fig. 5, projecting through the end wall and flanged at 31 to receive screws 32 whereby it is attached to the wood; its inner end is threaded to receive the nut 33 and the same thread serves for the gland nut 34 whereby the gland bushing 35 may be drawn tightly against suitable packing that seals the joint. In the present case this packing is composed of a series of metal collars 36 interposed between which are the wood collar 38 and the collar 39 of felt or the like. The end of the nut 34 and the bottom of the gland cavity are preferably so tapered as to force the end collars down onto the shaft. At the opposite ends of the hollow shafts, similar steam-tight joints are formed by attaching the fitting 45 to the casings 46 and by providing the nut 47, bushing 48 and packing collars 49. Both ends of the machine may be identical in respect to the construction of the glands and the casing, the driving gears, however, being preferably omitted at least in the smaller machines. The steam is independently supplied to the two drums by the main 50, the branch pipes 51 and the valves 52—53, and is permitted to escape at the discharge end through the valved pipes 55 that preferably lead to a suitable steam trap 56 from which the condensed water flows back to the boiler. The trap obviously might be omitted, the outlet of the pipes 55 being then directly to the atmosphere.

Were no means provided to prevent it, the milk would blister or burn on the outer surface of the drums, therefore a plurality of pressure or saddle bars, preferably one pair for each drum, are arranged to conform to and bear closely thereon. These bars, which may be of bronze or other soft material, are also preferably made in sections 60, Figs. 2, 3, 4, 8 and 9, the sections of each pair being joined by yoke bars 61 and the latter being connected to one another by cross-bars 62. As best shown in Fig. 4, the adjacent sections of a given pair of bars preferably meet each other in oppositely inclined tapering surfaces 63—64, it being desirable to also offset the surface 63 longitudinally of the drum from the surface 64. The drums, in the embodiment of the invention shown, both turn in the direction of the arrows, Figs. 4 and 8, and although the weight of the pressure bars is ordinarily sufficient to hold their tapered lower edges in line contact therewith, (this action being facilitated by the somewhat flexible connection afforded by the elements 61—62), it is desirable to connect the cross bars 62 corresponding to the end sections, Figs. 2, 3 and 4, by braces 66 at the ends of which engage the air pipes 67—68 (hereinafter described). By dividing the outer ends of the braces so that they straddle the pipes 68, it is evident that the sections are thus prevented from crowding one another lengthwise as well as from being thrown from the drums—this while permitting ready removal of the scraper sections for cleaning.

Depending into the liquid preferably midway between the drums are a series of air blast jets 70—71—72—73 that are supplied with large volumes of air as by means of the headers 74, the branch pipes 75, main 76, and a suitable fan, not shown. It is desirable that the outlet ends of the jets be in the form of T's 78 opening lengthwise of the vat, but other nozzles may of course be used. The jets are connected to the headers by sanitary unions 79. The central portion of the top is open for a considerable distance to receive the stock 80 through which the vapor escapes, and in order to distribute the air substantially uniformly into the liquid the jet pipes 72—73 may be offset from the headers as shown in Fig. 2.

Operation: The vat is initially filled to a level somewhat above the upper surface of the drums, the latter are set rotating, and live steam, say at 45 or 50 pounds per square inch indicated pressure, is admitted through the valves 52—53. In starting a good deal of the water of condensation may be gotten rid of through the pipes 85 and drip cocks 86. It is evident that the pressure of steam in the drums may be readily controlled by the admission valves together with those in the outlet pipes 55. In this connection, the action within the drums is of importance otherwise than as heretofore pointed out, for the water condensed from the steam is thrown out to the inner surface of the drum and fills the narrow space between said surface and the ends of the passages 18, thereby tending to form a water seal and giving the steam an opportunity to expel it. The practical result is that the drum is, in effect, kept dry, and the heat is therefore transmitted to the milk or other liquid at a high rate. The speed of the drums may be varied considerably, but must be high enough to enable the pressure bars to keep the surface well cleaned and to allow for only a practically instantaneous contact of a given molecule of the liquid therewith. Immediately upon starting the drums the air is admitted into the jets, thus setting up a violent agitation and blowing out the moisture and further tending to prevent scorching on the drums. By proper manipulation the temperature of the milk may be maintained practically constant at say 165° F., thus insuring a thoroughly pasteurized and palatable product.

The device is readily operated, either on batches or continuously, and constitutes means within reach of the relatively small producer or dealer whereby an efficient evaporation and pasteurization may be obtained, and whereby the surplus supply of milk from day to day may be evaported and kept sweet until such time as required to meet the varying demand. While I have described the apparatus particularly with reference to the treatment of milk, it may also be used with other liquids and food products, such, for instance, as cider or sap.

I claim:

1. A combined evaporator and pasteurizer comprising a vat adapted to contain milk, a rotatable substantially cylindrical steam drum immersed therein, said drum being supported on alined hollow shafts, means for supplying steam through one of the shafts to the drum, the water of condensation escaping through the other shaft, said drum including a passage leading from the last mentioned shaft to a point located approximately on the inner surface of the drum cylinder, whereby water is trapped and blown from the drum by the steam.

2. In combination, a vat, a plurality of rotatable heating drums arranged parallel to one another therein, and cleaning means for the drums comprising cleaner bars, one for each drum, bearing on the corresponding outer surface thereof, said cleaning means also comprising cross connections between the bars whereby the cleaning means corresponding to a given longitudinal portion of the drums may be removed as a unit.

3. In combination, a vat, a substantially horizontally disposed hollow rotatable drum therein, and cleaning means for the drum comprising a pair of connected pressure bars supported on the outer surface of said drum on opposite sides of the central vertical longitudinal plane thereof.

4. In combination, a vat, a substantially horizontally disposed hollow rotatable drum therein, and cleaning means for the drum comprising a bar extending longitudinally thereof and pressing thereon, said bar including a plurality of sections contacting with the drum substantially in the same straight line, the adjacent sections overlapping longitudinally of the drum.

5. In combination, a vat, a hollow rotatable drum therein, and cleaning means for the drum comprising a pair of connected pressure bars bearing on the outer surface of the drum on opposite sides of a longitudinal radial plane thereof, said bars being formed in sections, the joints between the sections of one of the bars being in staggered relation with those between the sections of another of the bars.

6. In combination, a vat, a horizontally disposed hollow rotatable drum therein, and cleaning means for the drum comprising a pair of saddle bars connected together and arranged longitudinally of the drum on opposite sides of the central vertical plane thereof and contacting therewith along lines somewhat below the uppermost element of the drum, whereby the weight of the bars tends to prevent them from being displaced from the drum.

7. In combination, a rotatable drum, a cleaning bar bearing on the outer surface thereof, said bar being formed in sections longitudinally of the drum, and means coöperating with the end sections for preventing the intermediate sections from crowding the end sections endwise from the drum.

8. In combination, a vat, a substantially horizontal drum rotatable therein, a pair of bars, one on each side of the central vertical plane of the drum, riding on said drum, said bars each being formed in overlapping sections, the corresponding sections of the bars being connected together to form saddle-like elements, and means for preventing one of said elements from being displaced laterally from the drum.

9. In combination, a vat to hold liquid food products, a substantially horizontal heating drum in the vat constantly submerged in said liquid, and an air jet extending down into the vat and arranged to discharge air in currents directed longitudinally of the lower surface of the drum.

10. In combination, a covered vat to hold liquid food products having a stack rising therefrom, a substantially horizontal heating drum in the vat and constantly submerged in the food products, and an air jet extending down into the vat and offset lengthwise thereof to bring its discharge end substantially beneath said stack and below the axis of the drum.

11. In combination, a vat to hold liquid food products and a drum rotatable therein about a substantially horizontal axis and consequently submerged in said liquid food products, an air jet extending down into the vat, a cleaner pressing on the drum, and means associated with the air jet for preventing the cleaner from being displaced from the drum.

12. The process of evaporating and pasteurizing milk and liquid milk products which consists in subjecting individual particles of the liquid to repeated momentary contacts with a hollow rotating drum containing live steam at considerable pressure in direct contact with the inner surface of the outer wall of the drum, repeatedly cleaning the outer surface of said wall while in contact with the liquid, and blowing air through the liquid in quantities sufficient to prevent the temperature from rising materially above that at which pasteurization takes place.

13. The process of evaporating and pasteurizing milk and liquid milk products which consists in subjecting individual particles of the liquid to repeated momentary contacts with a submerged rotating cylinder to which heat is applied at temperatures considerably above the boiling point of water at atmospheric pressure, repeatedly cleansing the surface of said cylinder often enough to prevent the accumulation of objectionable adhesions of said food product thereon, and simultaneously forcing air through said food product to prevent the temperature from rising to an objectionable degree and to carry off the vapor.

14. In combination with a vat for liquid food products and a submerged rotatable steam drum therein, means for supplying steam at above 212° F. to said drum, means acting on the surface of said drum below the surface of the liquid food to clean the drum often enough to prevent the blistering or adhering of said food products thereto, and means for simultaneously forcing air through said food products to keep the temperature down and to carry off vapors.

15. An evaporator comprising a vat, for holding liquid food products, a rotatable cylindrical drum entirely submerged in said liquid, means for supplying live steam to the drum, and centrifugally controlled means for constantly separating water of condensation from the steam in said drum, whereby the inner surface of said drum is kept substantially free from contact with the steam.

16. The process of evaporating and pasteurizing milk and other liquid food products which consists in subjecting individual particles of the liquid to repeated momentary contacts with a rotating drum which is constantly submerged in the liquid and heated considerably above 212° F., repeatedly cleaning said drum while in contact with the liquid by means submerged in the liquid, and simultaneously blowing air through the liquid in quantities sufficient to prevent the temperature from rising materially above that at which pasteurization takes place.

JOHN F. RUFF.